United States Patent
Miyoshi

(10) Patent No.: US 8,488,179 B2
(45) Date of Patent: Jul. 16, 2013

(54) INPUT DEVICE HAVING TOUCH PANEL AND IMAGE PROCESSING APPARATUS EQUIPPED WITH THE SAME

(75) Inventor: Fuminori Miyoshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 238 days.

(21) Appl. No.: 13/046,818

(22) Filed: Mar. 14, 2011

(65) Prior Publication Data

US 2011/0222097 A1    Sep. 15, 2011

(30) Foreign Application Priority Data

Mar. 15, 2010  (JP) .................................. 2010-057358

(51) Int. Cl.
  *G06K 15/00*   (2006.01)
(52) U.S. Cl.
  USPC ......... 358/1.16; 358/1.14; 358/1.15; 382/317
(58) Field of Classification Search
  USPC ... 358/1.1–1.18; 345/102, 173, 178; 382/317; 399/81, 84, 82
  See application file for complete search history.

(56) References Cited

U.S. PATENT DOCUMENTS

| 5,729,350 A * | 3/1998 | Ozaki | 358/296 |
| 8,289,269 B2 * | 10/2012 | Nanbu | 345/102 |
| 2008/0062115 A1 * | 3/2008 | Brown | 345/102 |
| 2010/0134525 A1 * | 6/2010 | Nanbu | 345/690 |
| 2010/0134526 A1 * | 6/2010 | Nanbu | 345/690 |

FOREIGN PATENT DOCUMENTS

| JP | 8-16296 A | 1/1996 |
| JP | 11-191822 A | 7/1999 |
| JP | 2009-3756 A | 1/2009 |
| JP | 2009-119931 A | 6/2009 |

* cited by examiner

*Primary Examiner* — Twyler Haskins
*Assistant Examiner* — Dennis Dicker
(74) *Attorney, Agent, or Firm* — Birch, Stewart, Kolasch & Birch, LLP

(57) ABSTRACT

When a quantity of light of a liquid crystal back light falls below a predetermined value, a detecting section of an input device outputs to a first control section a failure-detected signal indicating that a failure occurred in the liquid crystal back light of an operation panel. When a touched area is inputted from a touch panel after the failure-detected signal was inputted, the first control section, referring to a failure time table, transmits setting information corresponding to a display area that includes the touched area to a second control section of an image forming apparatus.

6 Claims, 14 Drawing Sheets

FIG.5A

| SETTING INFORMATION | DISPLAY AREA |
|---|---|
| COPYING FUNCTION | (X1,Y3)～(X2,Y6) |
| FAX TRANSMITTING FUNCTION | (X3,Y3)～(X4,Y6) |
| SCANNING FUNCTION | (X5,Y3)～(X6,Y6) |

| SETTING INFORMATION | DISPLAY AREA |
|---|---|
| SPECIFY PAPER SIZE | (X1,Y1)～(X2,Y4) |
| SPECIFY MAGNIFICATION FACTOR | (X3,Y1)～(X4,Y4) |
| SPECIFY DOUBLE/SINGLE SIDE | (X5,Y1)～(X6,Y4) |
|  |  |

| SETTING INFORMATION | DISPLAY AREA |
|---|---|
| B5 | (X1,Y1)～(X2,Y2) |
| B4 | (X2,Y1)～(X2,Y2) |
| A4 | (X1,Y2)～(X2,Y3) |
|  |  |

| SETTING INFORMATION | DISPLAY AREA |
|---|---|
| START COPYING ON PAPER OF THE SAME SIZE AS DOCUMENT AT MAGNIFICATION OF UNITY | (X0,Y0)～(X10,Y10) ※DESIGNATE THE WHOLE AREA OF THE LIQUID CRYSTAL DISPLAY SECTION AS A DISPLAY AREA |

FAILURE TO DISPLAY THE OPERATION PANEL OCCURRED.

PLEASE CONTACT OUR SERVICE CENTER URGENTLY.
PHONE NUMBER: 0123-4567-8901

BEFORE OUR MAINTENANCE STAFF ARRIVES,
THE APPARATUS CAN BE USED IN A MANNER BELOW.

ONE COPY IS OBTAINABLE PER ONE PUSH ON THE OPERATION PANEL.
(HOWEVER, THE COPY IS OF THE SAME SIZE AS DOCUMENT.)

| SETTING INFORMATION | DISPLAY AREA |
|---|---|
| B5 | (X1,Y1)～(X2,Y2) |
| B4 | (X2,Y1)～(X2,Y2) |
| A4 | (X1,Y2)～(X2,Y3) |
| START COPYING | (X6,Y6)～(X9,Y9) |

FAILURE TO DISPLAY THE OPERATION PANEL OCCURRED.
PLEASE CONTACT OUR SERVICE CENTER URGENTLY.
PHONE NUMBER: 0123-4567-8901 ~ 65D

IN ORDER TO PERFORM COPYING BEFORE OUR MAINTENANCE STAFF
ARRIVES, PLEASE FILL IN THE BOXES BELOW WITH PERTINENT CHECKS,
THEREAFTER PLACE THIS PAPER AT THE FOREFRONT OF A DOCUMENT
TO BE COPIED, AND THEN START COPYING.

NUMBER OF COPIES

| 1 | 2 | 3 | 4 | 5 |
|---|---|---|---|---|
| 6 | 7 | 8 | 9 | 10 |

SCALING (ENLARGE/REDUCE)    COPY SIZE
                            B5 ☐   B4 ☐
                            A4 ☐   A3 ☐

DOUBLE SIDES / SINGLE SIDE
                            DOUBLE-SIDED COPY ☐
                            SINGLE-SIDE COPY ☐

FIG.13

| NUMBER OF TIMES OF PUSH | SETTING INFORMATION | DISPLAY AREA |
|---|---|---|
| 1ST PUSH | PRINT OUT A MARK SHEET | (X0,Y0)~(X10,Y10)<br>※ DESIGNATE THE WHOLE AREA OF THE LIQUID CRYSTAL DISPLAY SECTION AS A DISPLAY AREA |
| 2ND PUSH | PERFORM A PROCESS BASED ON THE CONTENTS DESCRIBED ON THE MARK SHEET | (X0,Y0)~(X10,Y10)<br>※DESIGNATE THE WHOLE AREA OF THE LIQUID CRYSTAL DISPLAY SECTION AS A DISPLAY AREA |

INPUT DEVICE HAVING TOUCH PANEL AND IMAGE PROCESSING APPARATUS EQUIPPED WITH THE SAME

CROSS REFERENCE

This Nonprovisional application claims priority under 35 U.S.C. §119(a) on Patent Application No. 2010-057358 filed in Japan on Mar. 15, 2010, the entire contents of which are hereby incorporated by reference.

BACKGROUND OF THE INVENTION

The present invention relates to an input device including a touch panel and an image processing apparatus equipped with the input device.

An image forming apparatus is equipped with an input device that accepts operation inputs such as image forming conditions including paper size, number of prints to be made and the like. Among such input devices is one that is equipped with hard keys and an operation panel. The hard keys are assigned to operation keys of a single function such as power supply ON/OFF key and the numeric keys. The operation panel is configured laying a touch panel on top of a display section such as LCD or EL.

As an example, the display section of the LCD is lit up by a backlight and, based on data to be displayed, displays icons that are assigned to various kinds of operation keys. The touch panel detects a push made to the display section and outputs an area that was pushed as a touched area. When the touched area is included within an area where an icon is displayed, the operation panel accepts the touch as an operation input made from an operation key to which the icon is assigned. By merely undergoing a change of the data to be displayed, the operation panel is capable of accepting an operation input as an input from any of the various kinds of operation keys.

In such an input device, when a failure occurs in the display section and/or the touch panel of the operation panel, there is no means for the operation input to be accepted.

Then, proposed in the Japanese Patent Unexamined Publication No. 08-016296 bulletin was an input device in which operation inputs are accepted even when a failure occurred in the operation panel by using a substitute member such as the hard keys. In the input device, when a failure occurs in the touch panel of the operation panel, the various kinds of operation keys to which the operation panel is assigned are substituted by the hard keys, and then details of the substitution are displayed on the display section. The input device then accepts operation inputs by the push of the hard keys based on the details displayed on the display section.

In the input device, however, when a failure occurs in the display section of the operation panel, it is incapable of displaying the details of the substitution on the display section; and hence it is unable to accept an operation input. For example, when the intensity of the backlighting becomes low, it fails to cause a user to recognize the icons on the display section; and hence it is unable to accept a correct operation input.

Further, in recent years, the number of input devices that are not equipped with the hard keys but equipped with only an operation panel that is capable of easily assigning thereto the various kinds of operation keys has increased. In such an input device that is equipped with only the operation panel, when a failure occurs, it is incapable of accepting an operation input in such a manner as described in the Japanese Patent Unexamined Publication No. 08-016296 bulletin, because there is no substitute member.

The present invention is directed to providing an input device that is capable of exactly accepting the operation inputs without using a substitute member even when a failure occurs in the display section of the operation panel, and an image processing apparatus equipped with the input device.

SUMMARY OF THE INVENTION

An input device according to the present invention comprises an operation panel, a detecting section, a first memory section and a first control section. The operation panel includes a display section that displays an image of each display member of a plurality of pieces of input information on a screen, and a touch panel that outputs a pressed area on the screen of the display section as a touched area. The detecting section detects a failure in the display section. The first memory section stores a normal time table that relates a plurality of pieces of input information that are displayed by the display section in normal time with respective display areas thereof, and a failure time table that relates input information in failure time with display area(s) thereof. While the detecting section does not detect a failure in the display section, the first control section, based on the normal time table, outputs a piece of input information that corresponds to a display area that includes the touched area at which an input was made from the touch panel. When the detecting section detects a failure in the display section, the first control section, based on the failure time table, outputs a piece of input information that corresponds to a display area that includes the touched area at which an input was made from the touch panel.

BRIEF DESCRIPTION OF THE DRAWINGS

FIG. 5 (A)-(D) are diagrams showing an example of a normal time table and a failure time table.

FIG. 7 is a diagram showing an example of an error paper form to inform that a failure occurred.

FIG. 10 is a diagram showing an example of a failure time table in the image forming apparatus.

FIG. 12 is a diagram showing an example of a mark sheet used for the setting of setting conditions in an image forming apparatus according to a third embodiment of the present invention.

FIG. 13 is a diagram showing an example of a failure time table in the image forming apparatus.

DETAILED DESCRIPTION OF THE INVENTION

Figure 1:
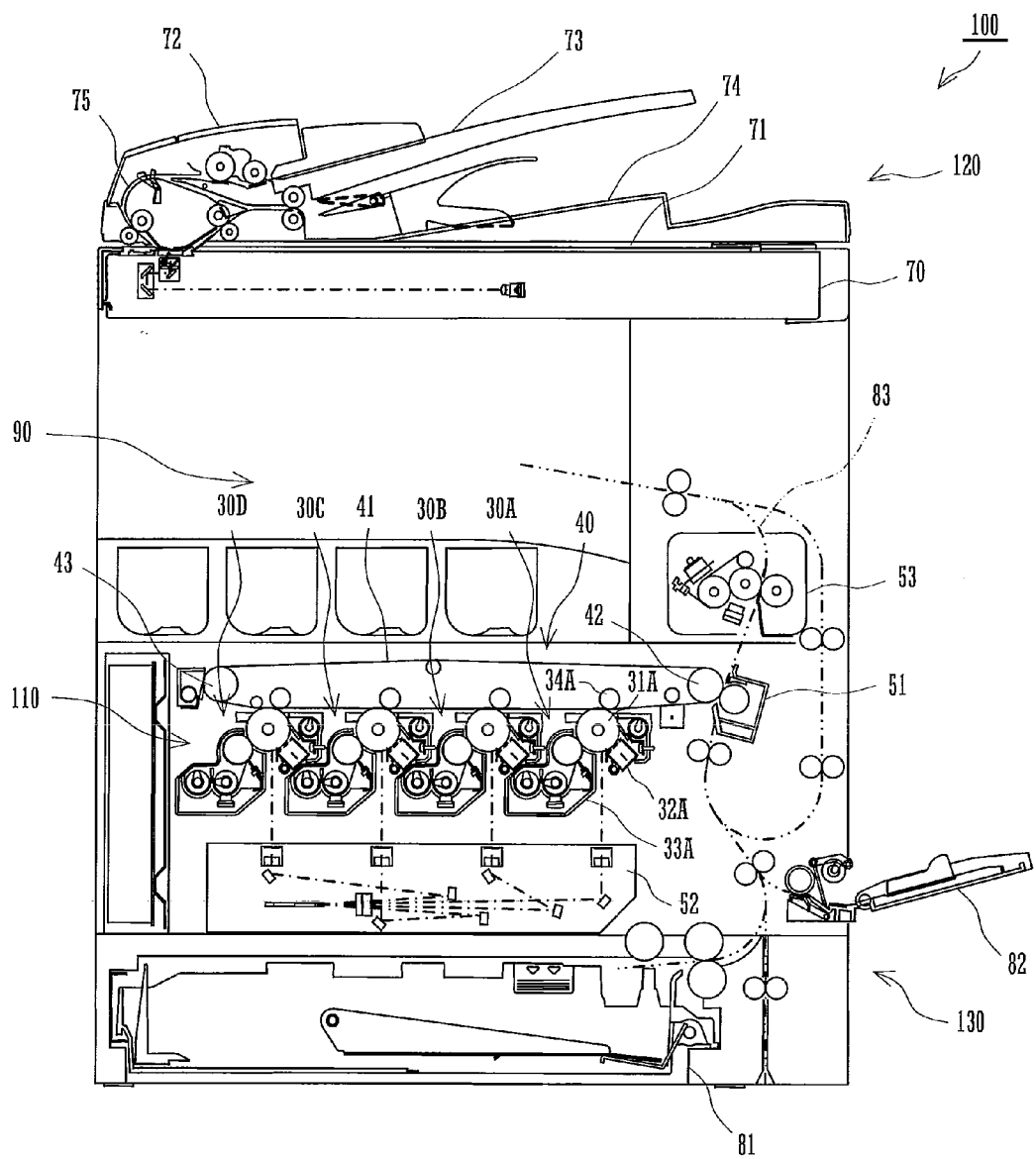
FIG. 1 is a schematic front sectional view of an image forming apparatus according to a first embodiment of the present invention.

An image processing apparatus equipped with an input device according to an embodiment of the present invention is explained below referring to the drawings.

As shown in FIG. 1, an image forming apparatus (image processing apparatus according to the present invention) 100 according to a first embodiment of the present invention forms a multicolored or monochromatic image onto a predetermined sheet of paper based on image data that have been read from a document. The image forming apparatus 100 comprises an input device 20 (refer to FIG. 2), an image reading section 120, an image forming section 110 and a paper supply section 130.

The input device 20 includes an operation panel 23, and thereby accepts an operation input from a user.

The image reading section 120 includes a scanner unit 70, a document table 71 and an automated document feeder 72, and reads images on both front and back sides of a document in either a reversed document reading method or a simultaneous double-sides reading method. The scanner unit 70 is, for example, a sensor of reduction optical system type, and thereby capable of reading an image with high accuracy. The document table 71 is made of rigid sheet glass.

The automated document feeder 72 is supported so as to be freely swung on the rear side of the top surface of the document table 71. When an operator wants to place a document on the document table 71 by manual operation, he or she is expected to open and close the top surface of the document table 71 by swinging the automated document feeder 72.

The automated document feeder 72 includes a document load tray 73 that receives a document before the image thereof is read and a document discharge tray 74 that receives the document after the image thereof was read. The document discharge tray 74 is disposed below the document load tray 73 with a predetermined space between its top and a bottom face of the document load tray 73. Inside the automated document feeder 72 is formed a conveying path 75 that stretches from the document load tray 73 to the document discharge tray 74.

Then, the image forming section 110 includes an intermediate transcription belt unit 40, image forming stations 30A through 30D, a secondary transcription unit 51, an exposure unit 52 and a fuser unit 53. The intermediate transcription belt unit 40 includes an intermediate transcription belt 41 that is an endless belt passing over in a freely rotatable manner and in a tensioned condition between a drive roller 42, an idle roller 43 and so forth.

The image forming stations 30A through 30D respectively perform image forming processes according to a method of electrophotography using developers of respective colors consisting of black, cyan, magenta and yellow. For example, in the image forming station 30A, an electrifier 32A, a developing device 33A and a primary transcription roller 34A are disposed around a photoreceptor drum 31A. The image forming stations 30B through 30D are configured in the same manner as the image forming station 30A.

The exposure unit 52 drives semiconductor lasers (not illustrated) based on the image data on the respective colors consisting of black, cyan, magenta and yellow that have been read by the image reading section 120, and distributes laser beams of the respective colors to the image forming stations 30A through 30D. The exposure unit 52 may be one that utilizes a light source other than the semiconductor laser, e.g. such as a light emitting diode array that is driven based on the image data.

For example, at the image forming station 30A, a circumferential surface of the photoreceptor drum 31A, after having been charged with electricity uniformly by the electrifier 32A, is exposed by the laser beam that is distributed from the exposure unit 52 based on the image data on black. Thereby, an electrostatic latent image is formed on the circumferential surface of the photoreceptor drum 31A based on the image data on black. Subsequently, a black developer is supplied from a developing device 33A to the circumferential surface of the photoreceptor drum 31A, and there the electrostatic latent image is rendered visible in a black toner image. The toner image that is formed on the circumferential surface of the photoreceptor drum 31A is then transcribed onto the surface of the intermediate transcription belt 41 by the primary transcription roller 34A.

In color image forming, the processes similar to that at the image forming station 30A are also carried out as to the respective colors of cyan, magenta and yellow at the image m forming stations 30B through 30D. The toner images of the respective colors consisting of black, cyan, magenta and yellow are superimposed on the surface of the intermediate transcription belt 41.

The secondary transcription unit 51 transcribes onto paper the toner image that is borne on the surface of the intermediate transcription belt 41. The fuser unit 53 applies heat and pressure to the paper on which the toner image has been transcribed, and thus fixes the toner image on the paper.

The paper supply section 130 includes a paper cassette 81 and a hand-fed paper tray 82. In the paper cassette 81, a plurality of sheets of paper of a size and kind with a relatively high frequency in use are received. On the hand-fed paper tray 82, a sheet of paper of a size and kind with a relatively low frequency in use is placed. A paper conveying path 83 is formed extending from the paper supply section 130 to a paper discharge section 90.

Figure 2:
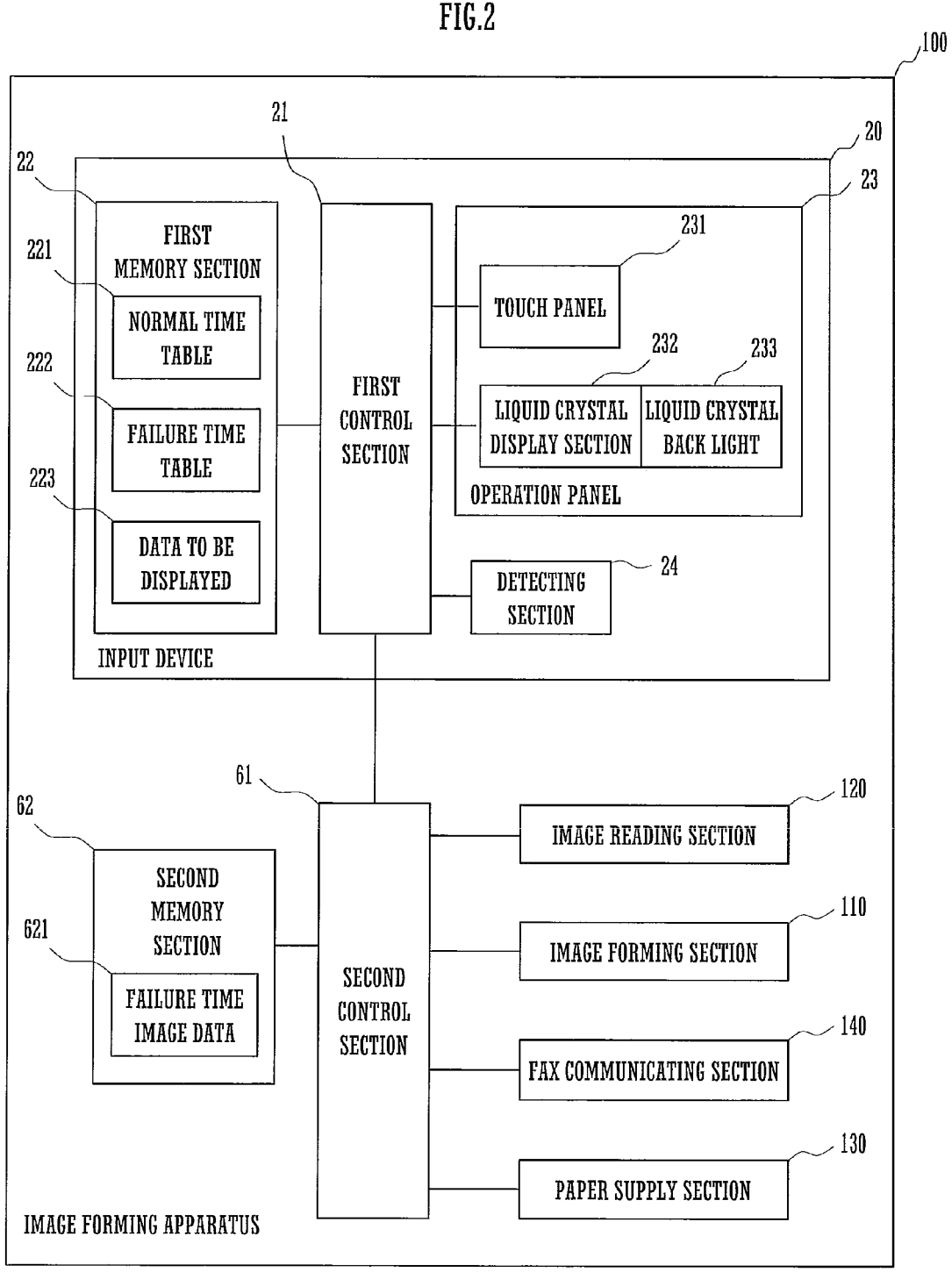
FIG. 2 is a block diagram showing a configuration of the image forming apparatus.

Subsequently, a configuration of the image forming apparatus 100 is explained. As shown in FIG. 2, the image forming apparatus 100 comprises not only the input device 20, the image reading section 120, the image forming section 110, the paper supply section 130 but also a second control section 61, a second memory section 62 and a FAX communicating section 140. The input device 20 includes a first control section 21, a first memory section 22, an operation panel 23 and a detecting section 24.

The first control section 21 of the input device 20 controls the first memory section 22, the operation panel 23 and the detecting section 24. The first control section 21 controls communications with the second control section 61.

The operation panel 23 is made of a touch panel 231, a liquid crystal display section 232 and a liquid crystal back light 233 that are laid in layers. The liquid crystal display section 232 displays icons (display members) for various kinds of setting information on image processing based on data to be displayed 223. The setting information includes selection condition for selecting functions on image processing, setting conditions for specifying conditions of respective functions, a start order to cause the second control section 61 to carry out respective functions, and so forth. For example, the selection condition includes selection of copying function for copying a document, scanning function for reading an image of a document, FAX transmitting function for sending a document by facsimile and the like. Setting conditions on the copying function includes specifying the number of copies to be made, a paper size and so on. Setting conditions on the scanning function includes specifying a scaling size, a destination for storage and so forth. Setting conditions on the FAX transmitting function includes specifying a destination of facsimile and the like. The start order causes the second control section 61 to carry out the copying function, the scanning function, the FAX transmitting function and/or the like. Moreover, the display members on the liquid crystal display section 232 are not limited to the icons; instead, they may be letters, photographs and/or the like.

The touch panel 231 is disposed on a screen of the liquid crystal display section 232. The touch panel 231 detects a pressed area on the screen of the liquid crystal display section 232 as a touched area, and then outputs the pressed area to the first control section 21. The liquid crystal back light 233 lights up the liquid crystal display section 232 from its rear face.

The detecting section 24 comprises an optical sensor for monitoring liquid crystal back light, and when a quantity of light of the liquid crystal back light 233 falls below a predetermined value, it outputs to the first control section 21 a failure-detected signal indicating that a failure occurred in the liquid crystal back light 233.

The first memory section 22 stores a normal time table 221, a failure time table 222 and data to be displayed 223. The normal time table 221 is referred to by the first control section 21 for the time when no failure occurs in the liquid crystal back light 233 (hereinafter referred to as normal time), and as shown in FIG. 5(A) through FIG. 5(C), stores a plurality of pieces of the setting information and respective display areas thereof on the screen of the liquid crystal display section 232, relating the former with the latter. A plurality of icons that the liquid crystal display section 232 displays based on the data to be displayed 223 respectively indicate the plurality of pieces of the setting information on the normal time table 221, and are disposed at corresponding display areas.

The failure time table 222 is referred to by the first control section 21 at the time when a failure occurred in the liquid crystal back light 233 (hereinafter referred to as failure time), and as shown in FIG. 5(D), stores the setting information for copying a document on paper of the same size as the document at magnification factor of unity, relating the setting information with the whole area on the screen of the liquid crystal display section 232.

The second control section 61 controls the second memory section 62, the image reading section 120, the image forming section 110, the paper supply section 130, and the FAX communicating section 140 that transmits and receives FAX data through the telephone line. The second control section 61 controls a communication with the first control section 21 of the input device 20.

The second memory section 62 stores a failure time image data 621 to be referred to at failure time by the second control section 61.

Subsequently, referring to the FIGS. 3 through 7, process m routines of the first control section 21 and the second control section 61 are explained. As to normal time, a case where the copying function was selected is explained by way of example.

Figure 3:
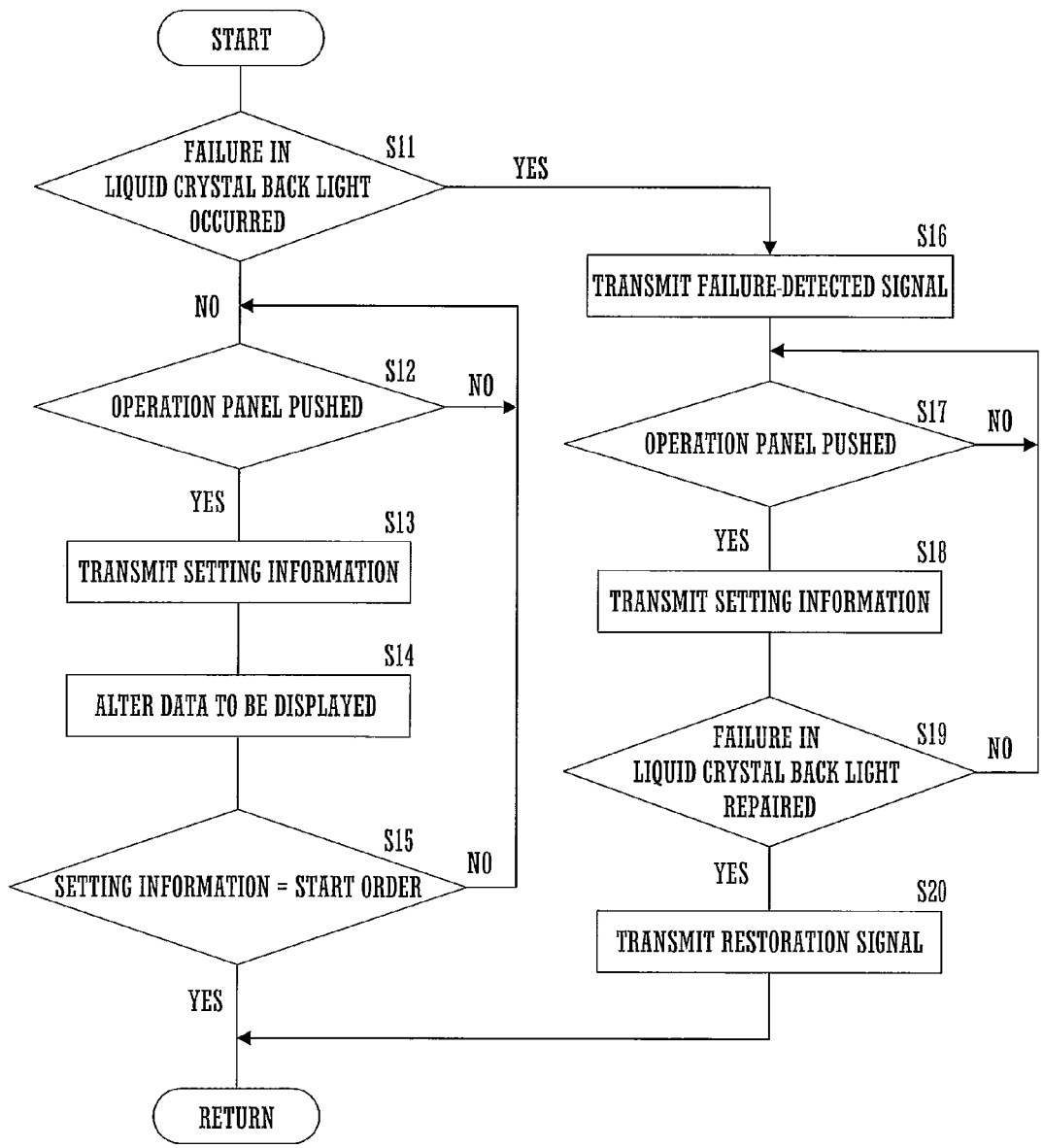
FIG. 3 is a flowchart showing a process routine of an input device.
Figure 4A:
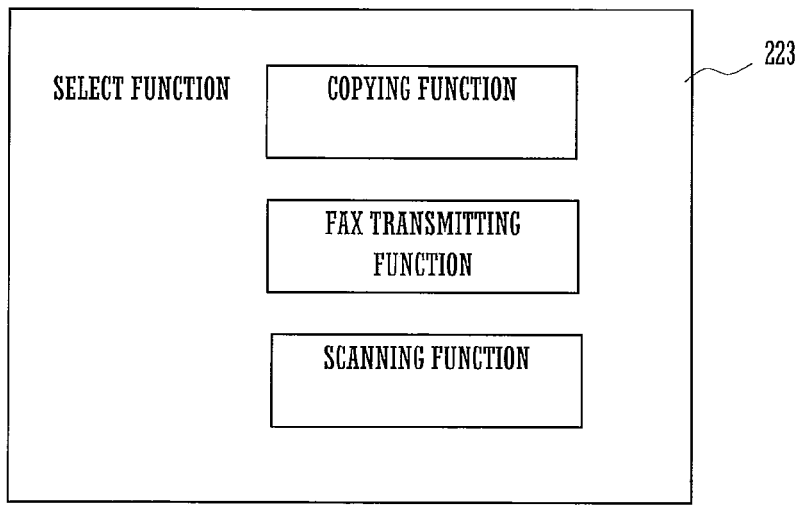
FIG. 4 (A)-(C) are diagrams showing an example of data to be displayed on a liquid crystal display section.
Figure 4B:
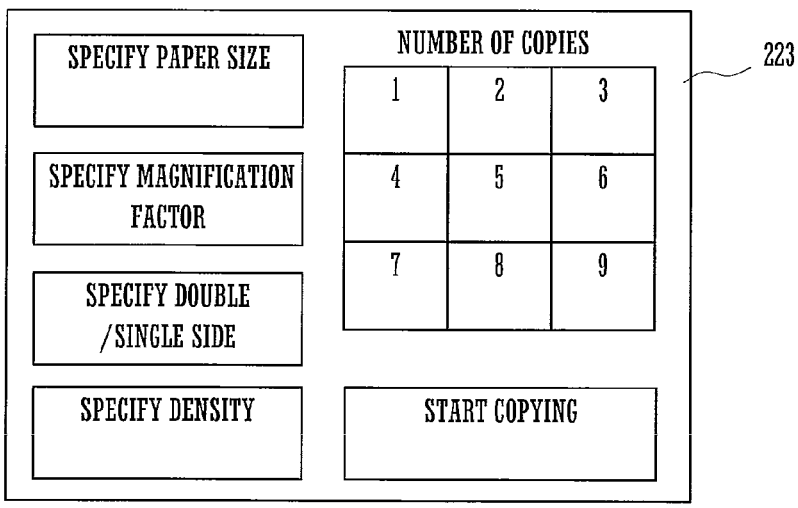
Figure 4C:
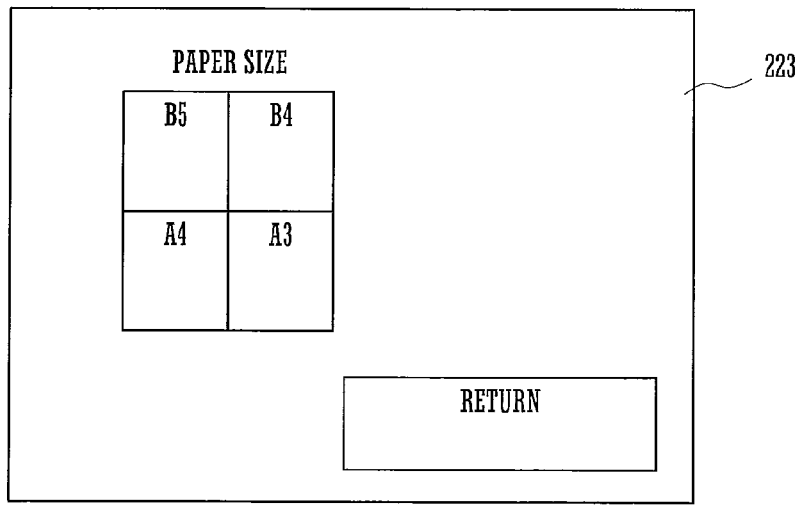

As shown in FIG. 3, the detecting section 24 of the input device 20 monitors the quantity of light of the liquid crystal is back light 233, detects that a failure occurred when the quantity of light fell below a predetermined value, and then outputs a failure-detected signal to the first control section 21 (S11). The first control section 21 displays the data to be displayed 223 as shown in FIG. 4(A) on the screen of the liquid crystal display section 232 for the time when no failure occurs (S11: No). When a touched area is inputted from the touch panel 231 (S12), the first control section 21, referring to a normal time table 221 as shown in FIG. 5(A), acquires the setting information (copying function) corresponding to the display area where the touched area is included. The first control section 21 transmits the acquired setting information to the second control section 61 (S13). The first control section 21 alters the data to be displayed 223 on the liquid crystal display section 232 to the data to be displayed 223 corresponding to the copying function (refer to FIG. 4(B)) (S14). Since the setting information (copying function) transmitted to the second control section 61 is not the start order indicating start copying (S15), the step is returned to S12.

When a touched area is inputted from the touch panel 231 (S12), the first control section 21, referring to a normal time table 221 as shown in FIG. 5(B), acquires the setting information (paper size designation) corresponding to the display area where the touched area is included. The first control section 21 transmits the acquired setting information to the second control section 61 (S13). The first control section 21 alters the data to be displayed 223 on the liquid crystal display section 232 to the data to be displayed 223 corresponding to the paper size designation (refer to FIG. 4(C)) (S14). Since the setting information (paper size designation) transmitted to the second control section 61 is not the start order indicating start copying (S15), the step is returned to S12.

When a touched area is inputted from the touch panel 231 (S12), the first control section 21, referring to a normal time table 221 as shown in FIG. 5(C), acquires the setting information (paper size A4) corresponding to the display area where the touched area is included. The first control section 21 transmits the acquired setting information to the second control section 61 (S13). The first control section 21 alters the data to be displayed 223 on the liquid crystal display section 232 back to the previous data to be displayed 223 (refer to FIG. 4(B)) (S14). Since the setting information (paper size A4) transmitted to the second control section 61 is not the start order indicating start copying (S15), the step is returned to S12.

When a touched area is inputted from the touch panel 231 (S12), the first control section 21, referring to a normal time table 221 as shown in FIG. 5(B), acquires the setting information (start copy) corresponding to the display area where the touched area is included. The first control section 21 transmits the acquired setting information to the second control section 61 (S13). The first control section 21 alters the data to be displayed 223 on the liquid crystal display section 232 yet back to the previous data to be displayed 223 (refer to FIG. 4(A)) (S14). Since the setting information (start copy) transmitted to the second control section 61 is the start order indicating start copying (S15), the step is returned to S11.

In this manner, the first control section 21 accepts operation inputs in order of the selection condition, the setting conditions and the start order, and then transmits the operation inputs to the second control section 61. The second control section 61, based on the selection condition, the setting conditions and the start order that are received from the first control section 21, controls the respective functional sections to perform an image processing.

Besides, when a failure occurred (S11: Yes), the first control section 21 transmits a failure-detected signal to the second control section 61 (S16). When a touched area is inputted from the touch panel 231 (S17), the first control section 21, referring to a failure time table 222 as shown in FIG. 5(D), acquires the setting information (start copy on paper of the same size as the document at magnification factor of unity) corresponding to the display area where the touched area is included. The first control section 21 then transmits the acquired setting information (setting information indicating a paper size and setting information indicating start copying) to the second control section 61 (S18).

When the detecting section 24 detects that the quantity of light of the liquid crystal back light 233 has become not less than the predetermined value and thus the failure has been repaired (S19), the first control section 21 transmits a restoration signal to the second control section 61 (S20), and then the step is returned to S11. The first control section 21 repeats the processing steps S17 through S19 until the failure is removed.

Figure 6:
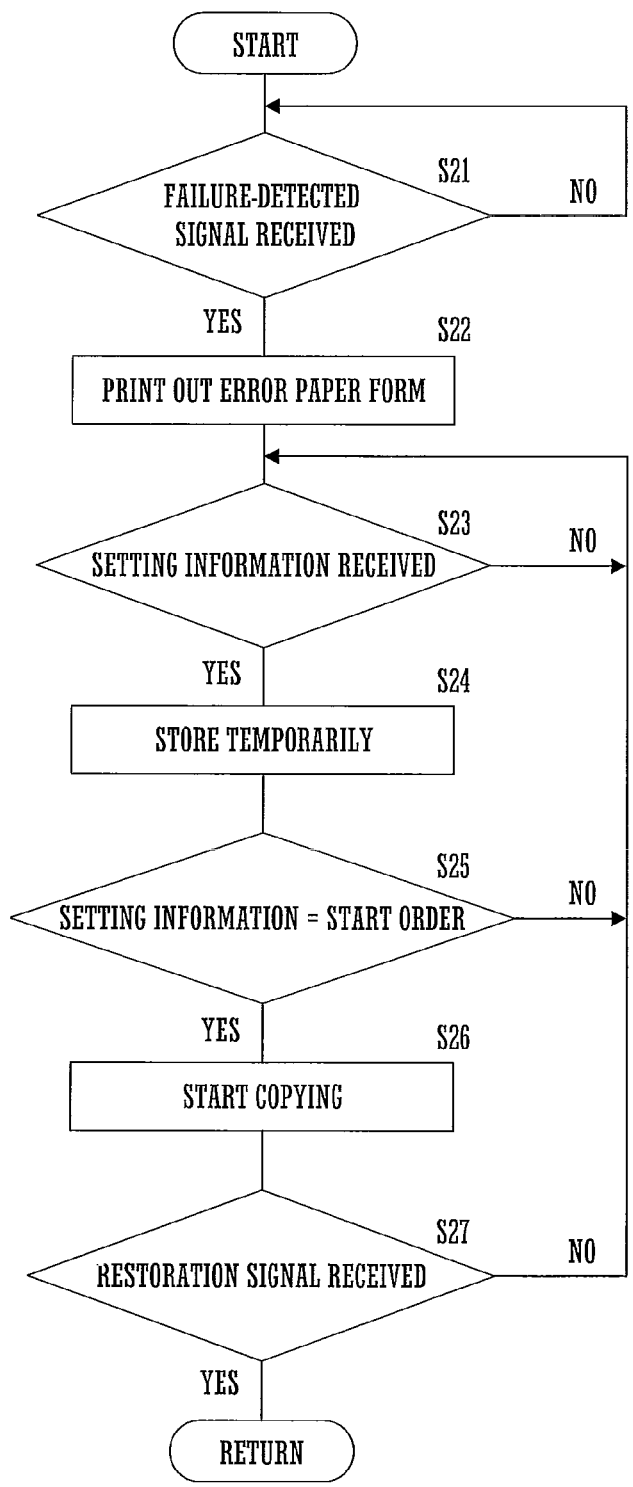
FIG. 6 is a flowchart showing a process routine of an image forming apparatus in failure time.

As shown in FIG. 6, the second control section 61, on receiving a failure-detected signal (S21), causes the image forming section 110 and the paper supply section 130 to print out an error paper form 65A as shown in FIG. 7 (S22). The error paper form 65A is one that is formed by the image forming section 110 based on the failure time image data 621 stored in the second memory section 62. The second control section 61, on receiving the setting information from the first control section 21 (S23), sequentially and temporarily stores the received setting information (S24). On receiving the setting information (start copy) indicating the start order (S25), the second control section 61 causes the image reading section 120, image forming section 110 and paper supply section 130 to start copying based on the stored setting information (S26). The second control section 61 repeats the processing steps S23 through S26 until it detects a restoration signal (S27).

As described above, the image forming apparatus 100, when detecting a failure in the liquid crystal back light 233, copies a document on paper of the same size as the document at magnification factor of unity each time the operation panel 23 receives a push. By this means, the image forming apparatus 100 is capable of performing the copying function without using any substitute member even when a failure in the liquid crystal back light 233 is detected.

Figure 8:
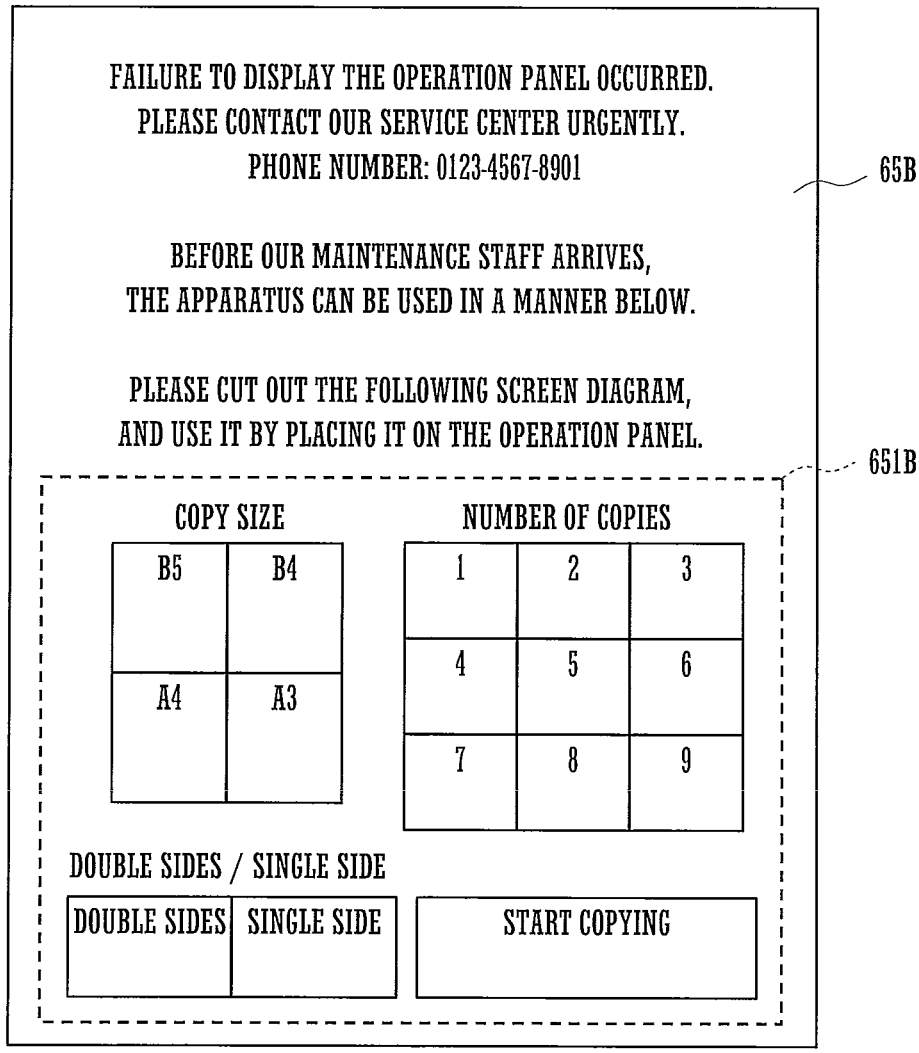
FIG. 8 is a diagram showing an example of an error paper form by the image forming apparatus according to a second embodiment of the present invention.

An image forming apparatus 100B according to a second embodiment of the present invention differs from the image forming apparatus 100 according to the first embodiment of the present invention in that the former carries out a copying function using an error paper form 65B as shown in FIG. 8. Explained below are solely on its differences form the image forming apparatus 100 according to the first embodiment.

Figure 9:
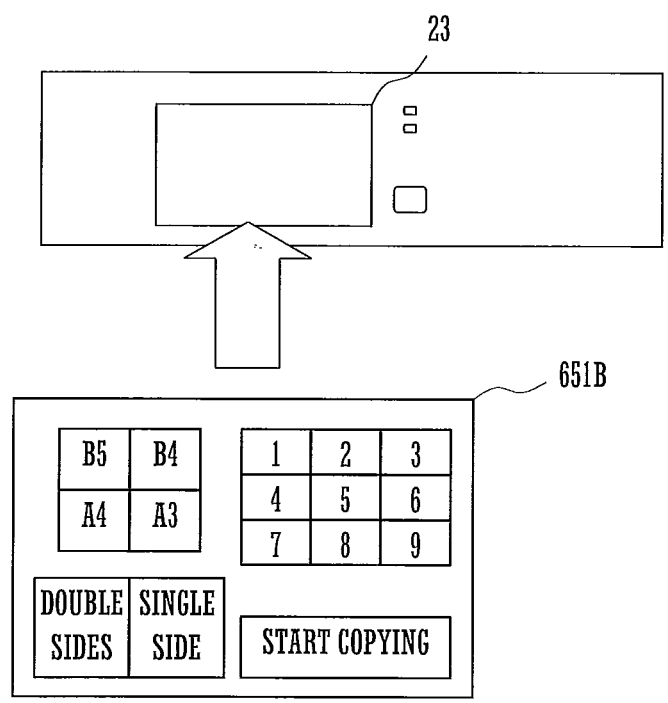
FIG. 9 is a diagram showing an application example of the error paper form by the image forming apparatus.

At S22 in FIG. 6, the second control section 61 prints out an error paper form 65B as shown in FIG. 8. On the error paper form 65B, icons indicating a plurality of pieces of setting information are printed within an area that is of the same size as the operation panel 23, and a cut-here line surrounding the area is printed. The error paper form 65B, when cut out along the cut-here line, turns into an operation paper form 651B. As shown in FIG. 9, the operation paper form 651B of the same size as the operation panel 23 is for use being placed on the operation panel 23, enabling a user to recognize positions of the icons indicating the respective plurality of pieces of setting information.

An failure time image data 621B is the image data printed on the error paper form 65B. A failure time table 222B, as shown in FIG. 10, stores the plurality of pieces of setting information printed on the operation paper form 651B and respective display areas thereof, relating the former with the latter.

By this means, the image forming apparatus 100B is capable of correctly selecting the setting conditions and thus performing the copying function without using any substitute member even when a failure in the liquid crystal back light 233 occurred.

Figure 11:
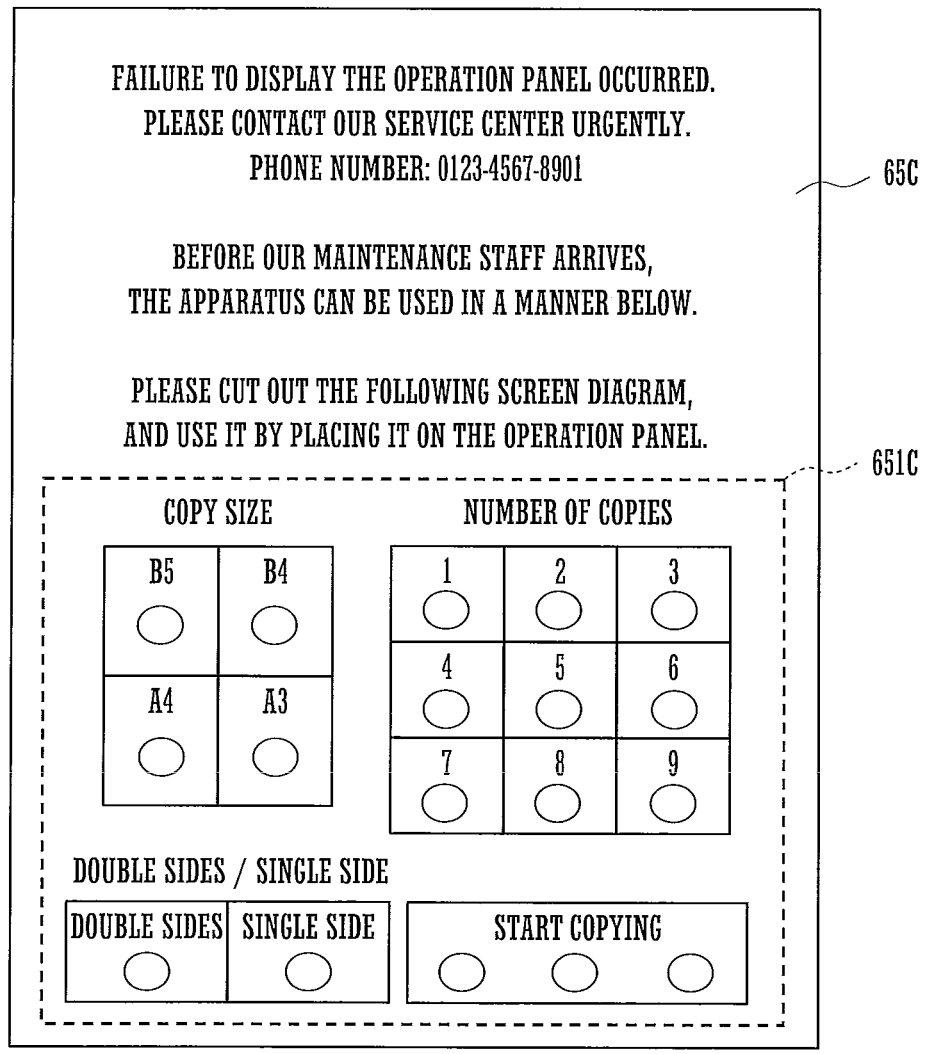
FIG. 11 is a diagram showing another example of an error paper form by the image forming apparatus.

Further, the image forming apparatus 100B may print out an error paper form 65C as shown in FIG. 11. On an operation paper form 651C of the error paper form 65C is formed a punched opening for each of the icons indicating the pieces of setting information. The punched opening is formed by a punch (not illustrated) which the image forming apparatus 100B is provided with. In this case, the first control section 21 of the input device 20 transmits the display areas of the failure time table 222 that is stored in the first memory section 22 to the second control section 61. The second control section 61 specifies positions at which the punched openings are to be formed based on the received display areas, and thereby controls the punch to punch the openings. By this means, since the image forming apparatus 100B allows a user to directly push the operation panel, it is capable of employing a touch panel 231 of capacitance sensing type in the operation panel 23.

An image forming apparatus 100D according to a third embodiment of the present invention differs from the image forming apparatus 100 according to the first embodiment of the present invention in that the former carries out a copying function using a mark sheet 65D as shown in FIG. 12. Explained below are solely on its differences form the image forming apparatus 100 according to the first embodiment.

The mark sheet 65D as shown in FIG. 12 is one of which image is formed by the image forming section 110 based on a failure time image data 621D. On the mark sheet 65D are printed check boxes (fill-in columns) for various kinds of setting conditions. A failure time table 222D as shown in FIG. 13 stores the setting information that depends on how many times push has been made, relating thereof with the whole area on the screen of the liquid crystal display section 232.

As shown in FIG. 3, when a failure occurs, the first control section 21 of the input device 20 transmits a failure-detected signal to the second control section 61 (S16). After that, when a touched area is inputted from the touch panel 231 (S17), the first control section 21, referring to a failure time table 222D as shown in FIG. 13, acquires the setting information (print out a mark sheet 65D) of which touched area is included in the display area and of which number of times push has been made is one. The first control section 21 transmits the acquired setting information to the second control section 61 (S18).

When the touched area is inputted from the touch panel 231 (S17), the first control section 21, referring to the failure time table 222D as shown in FIG. 13, acquires the setting information (perform a process based on the contents described on the mark sheet 65D) of which touched area is included in the display area and of which number of times push has been made is two. The first control section 21 transmits the acquired setting information to the second control section 61 (S18).

Figure 14:
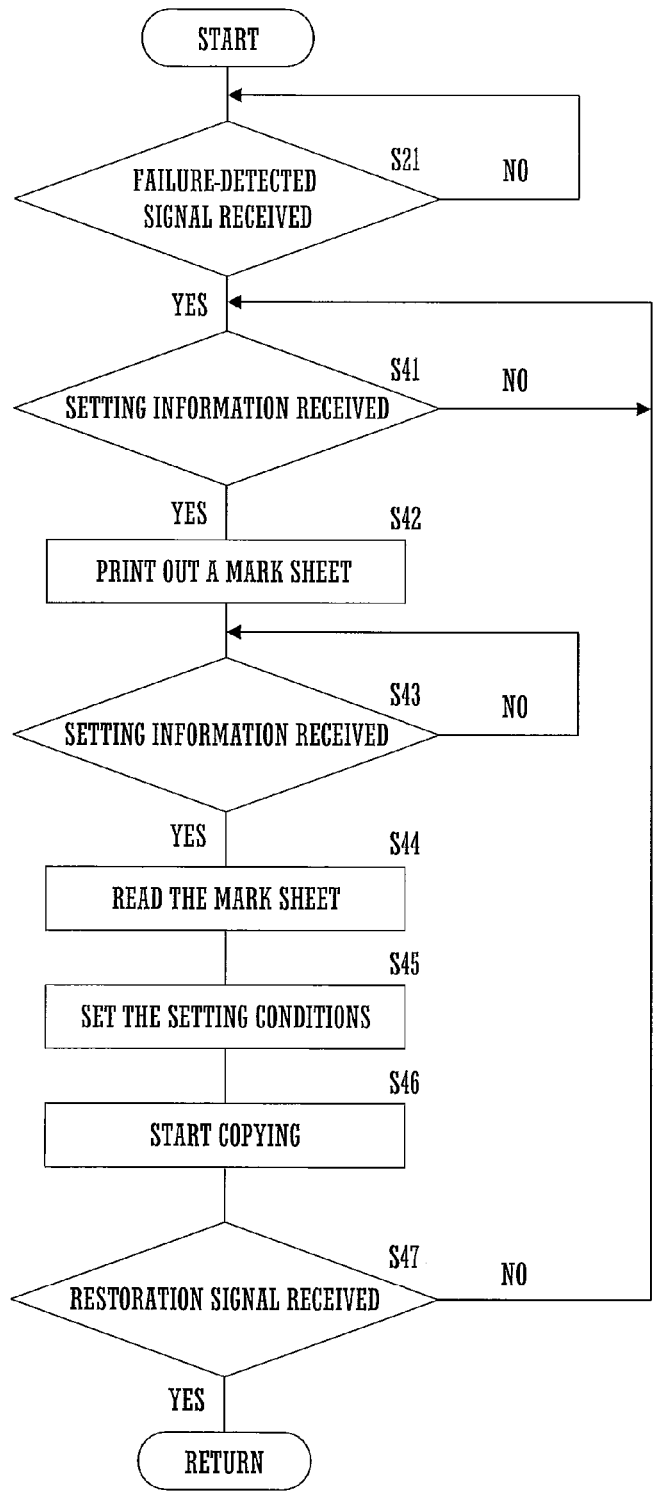
FIG. 14 is a flowchart showing a process routine of the image forming apparatus in failure time in the image forming apparatus.

As shown in FIG. 14, the second control section 61, upon receiving a failure-detected signal (S21), waits until it receives the setting information from the first control section 21 of the input device 20. The second control section 61, upon receiving the setting information (print out a mark sheet 65D) that corresponds to the first push (S41), causes the image forming section 110 and paper supply section 130 to print out the mark sheet 65D as shown in FIG. 12 (S42). The mark sheet 65D, after checks thereof having been finished on the various kinds of the setting information, is the one that is to be placed at the forefront of a document as an object to be copied.

The second control section 61, upon receiving the setting information (perform a process based on the contents described on the mark sheet 65D) that corresponds to the second push (S43), causes the image reading section 120 to read the image of the mark sheet 65D placed at the forefront and then to generate image data thereof (S44). The second control section 61, analyzing the image data, sets the setting conditions that have been marked with checks on the mark sheet 65D (S45). The second control section 61, on analyzing the image and then determining that the forefront document is a document other than the mark sheet 65D, may display an error message indicating "place the mark sheet at the forefront". In this case, the second control section 61 returns to the processing step of S44.

The second control section 61 starts a copying based on the setting conditions marked with checks on the mark sheet 65D (S46). The second control section 61 repeats the processing steps S41 through S46 until it receives a restoration signal (S47).

As described above, the image forming apparatus 100D, when the operation panel 23 is pushed once after having detected a failure in the liquid crystal back light 233, prints out a mark sheet 65D by which various kinds of the setting conditions are capable of being registered. Then, the image forming apparatus 100D, by reading an image on the mark sheet 65D placed at the forefront of the document, sets the various kinds of the setting conditions and starts a copying. By this means, the image forming apparatus 100D is capable of carrying out the copying function even when a failure in the liquid crystal back light 233 is detected.

Still, in the above described embodiments, selections in normal time were made in different hierarchies in order of the selection condition for selecting functions on image processing, the setting conditions for specifying conditions of respective functions, and the start order to cause the second control section 61 to carry out the respective functions; however, the selections on the selection condition, the setting conditions and the start order(s) may be made within a single hierarchy.

Further, in the above described embodiment it was assumed that in failure time only the copying function was operational; however, it may be such that in failure time only the scanning function or only the FAX function is capable of being carried out. Or it may be assumed that all the functions are operational the same as normal time. In this case, using an operation paper form 651B' (prime) on which only the start orders of the respective functions are printed, the image forming apparatus 100B, upon any of the functions being selected, may carry out the selected function under predetermined setting conditions. Also, the image forming apparatus 100D may use a mark sheet 65D' (prime) on which the selection condition, the setting conditions and the start order(s) are printed.

In addition, although the above described embodiments have explained about the image forming apparatus 100, 100B, 100D, the embodiment(s) may otherwise be a scanner unit that is not equipped with the image forming section 110. In this case, the error paper form 65A is not essential, but preparing the error paper form 65B, 65C and/or the mark sheet 65D beforehand will suffice.

In the above mentioned embodiments, the first control section 21 and the second control section 61 are connected so as to be communicable; however, the first control section 21 may be included in the second control section 61. In this case, the first memory section 22 is included in the second memory section 62.

The above explanation of the embodiments is nothing more than illustrative in any respect, nor should be thought of as restrictive. Scope of the present invention is indicated by claims rather than the above embodiments. Further, it is intended that all changes that are equivalent to a claim in the sense and realm of the doctrine of equivalence be included within the scope of the present invention.

What is claimed is:

1. An input device comprising:
    an operation panel including:
        a display section that displays, in a plurality of display areas on a screen, images of a plurality of display members each of which corresponds to a separate piece of input information; and
        a touch panel that outputs a pressed area on the screen of the display section as a touched area;
    a detecting section that detects a failure in the display section;
    a first memory section that stores a normal time table that indicates a relationship between the plurality of display areas on the display section and input information in normal time, together with a failure time table that indicates a relationship between at least one display area in the display section and input information in failure time; and
    a first control section that outputs input information corresponding to a display area that includes the touched area output from the touch panel based on the normal time table when the detecting section does not detect a failure and outputs input information corresponding to a display area that includes the touched area output from the touch panel based on the failure time table when the detecting section detected a failure.

2. An image processing apparatus comprising:
    an input device that includes,
        an operation panel including:
            a display section that displays, in a plurality of display areas on a screen, images of a plurality of display members each of which corresponds to a separate piece of input information; and
            a touch panel that outputs a pressed area on the screen of the display section as a touched area;
        a detecting section that detects a failure in the display section;
        a first memory section that stores a normal time table that indicates a relationship between the plurality of display areas on the display section and input information in normal time, together with a failure time table that indicates a relationship between at least one display area in the display section and input information in failure time; and
        a first control section that outputs input information corresponding to a display area that includes the touched area output from the touch panel based on the normal time table when the detecting section does not detect a failure and outputs input information corresponding to a display area that includes the touched area output from the touch panel based on the failure time table when the detecting section detected a failure,
        the input device outputting setting information on image processing of image data as the input information;
    a functional section that performs processing on the image data; and
    a second control section that controls the functional section based on the input information output from the input device.

3. The image processing apparatus as claimed in claim 2 further comprising:
    an image forming section that serves as the functional section and performs an image forming process on paper based on the image data; and
    a second memory section that stores failure time image data to be printed out in the failure time,
    wherein the input device outputs a failure-detected signal from the first control section to the second control section when the detecting section detected a failure, and
    wherein the second control section controls the image forming section so that the image forming section performs an image forming process based on the failure time image data when the failure-detected signal was inputted.

4. The image processing apparatus as claimed in claim 3, wherein the failure time image data includes image data disposing a display member in at least one display area on the display section.

5. The image processing apparatus as claimed in claim 4 further comprising:
   a punch that serves as a functional section and forms an opening on paper,
   wherein the second control section controls the punch so that the punch forms an opening at the display area on paper that has undergone an image forming process based on the failure time image data.

6. An image processing apparatus comprising:
   an input device that includes,
      an operation panel including:
         a display section that displays, in a plurality of display areas on a screen, images of a plurality of display members each of which corresponds to a separate piece of input information; and
         a touch panel that outputs a pressed area on the screen of the display section as a touched area;
      a detecting section that detects a failure in the display section;
      a first memory section that stores a normal time table that indicates a relationship between the plurality of display areas on the display section and input information in normal time, together with a failure time table that indicates a relationship between at least one display area in the display section and input information in failure time; and
      a first control section that outputs input information corresponding to a display area that includes the touched area output from the touch panel based on the normal time table when the detecting section does not detect a failure and outputs input information corresponding to a display area that includes the touched area output from the touch panel based on the failure time table when the detecting section detected a failure,
   the input device outputting, as the input information, setting information on image processing of image data depending on the touched area output from the touch panel;
   a second memory section that stores failure time image data including a fill-in column for the setting information in the failure time;
   an image reading section that carries out an image reading process in which an image is read and then image data thereof are generated;
   an image forming section that performs an image forming process on paper based on the image data; and
   a second control section configured so as to cause the image forming section to perform the image forming process based on the input information output from the input device,
   wherein the first control section outputs a failure-detected signal to the second control section when the detecting section detected a failure, and
   wherein the second control section is configured so as to carry out steps that follow in order of:
      a first control step that causes the image forming section to perform an image forming process based on the failure time image data and depending on the input information output from the input device after the failure-detected signal was inputted from the input device;
      a second control step that causes the image reading section to carry out the image reading process on the paper that has undergone the image forming process in the first control step and then extracts the setting information from the image data that the image reading section has generated; and
      a third control step that causes the image reading section to carry out the image reading process on a document and then performs image processing on the image data that the image reading section have read from the document based on the setting information that has been extracted in the second control step.

* * * * *